United States Patent [19]

Fukuhara

[11] 4,436,395

[45] Mar. 13, 1984

[54] FOCUS DETECTING DEVICE IN A SINGLE LENS REFLEX CAMERA

[75] Inventor: Toru Fukuhara, Isehara, Japan

[73] Assignee: Nippon Kogaku K.K., Tokyo, Japan

[21] Appl. No.: 344,728

[22] Filed: Feb. 1, 1982

[30] Foreign Application Priority Data

Feb. 6, 1981 [JP] Japan ............................ 56-15830[U]
Feb. 13, 1981 [JP] Japan ............................ 56-18185[U]

[51] Int. Cl.³ .......................... G03B 3/00; G03B 19/12
[52] U.S. Cl. .................................... 354/406; 354/152
[58] Field of Search ...................... 354/22, 23 R, 25 R, 354/25 A, 25 P, 25 N, 31, 31 F, 56, 152, 155, 54, 55

[56] References Cited

U.S. PATENT DOCUMENTS

| | | | |
|---|---|---|---|
| 3,601,027 | 8/1971 | Ono | 354/55 |
| 4,159,169 | 6/1979 | Sato | 354/25 P |
| 4,171,154 | 10/1979 | Fukuhara | 354/23 R |
| 4,258,989 | 3/1981 | Tokutomi et al. | 354/25 R |
| 4,314,748 | 2/1982 | Kawabata et al. | 354/25 |

FOREIGN PATENT DOCUMENTS 55-26516 2/1980 Japan .

*Primary Examiner*—William B. Perkey

*Attorney, Agent, or Firm*—Shapiro and Shapiro

[57] ABSTRACT

In a focus detecting device in a single lens reflex camera including a main reflecting mirror capable of partly transmitting incident light therethrough disposed in a light-passing shaft formed by a mirror box provided between an objective lens and a film surface to direct a light beam passed through the objective lens to a viewfinder optical system, and an auxiliary reflecting mirror for reflecting the light transmitted through the main reflecting mirror toward a predetermined wall surface of the mirror box lying at a location opposed to the viewfinder optical system with the main reflecting mirror interposed therebetween, there are provided reflecting means having first and second reflecting surfaces for separating the light reflected by the auxiliary reflecting mirror into two mutually opposed directions substantially orthogonal to the optical axis of the objective lens along said predetermined wall surface, first and second photoelectric converter means provided on the optical paths of the light beams separated by the first and second reflecting surfaces, and a pair of re-imaging means disposed in the optical paths leading from the auxiliary reflecting mirror to the first and second photoelectric converter means for forming a first image and a second image on the first and second photoelectric converter means from the image formed by the objective lens.

2 Claims, 4 Drawing Figures

FOCUS DETECTING DEVICE IN A SINGLE LENS REFLEX CAMERA

BACKGROUND OF THE INVENTION

1. Field of the Invention

This invention relates to a focus detecting device in a single lens reflex camara.

2. Description of the Prior Art

Already known is a focus detecting device for a single lens reflex camera in which a first image and a second image are formed by a pair of re-imaging lenses from a pair of light beams transmitted through two different areas of the exit pupil of a phototaking objective lens and the focused condition of the objective lens is detected from a variation in positin of the first image and the second image relative to a pair of image position detecting photoelectric converters disposed on or near the focal planes of the pair of re-imaging lenses.

In order that such a focus detecting device may be compactly incorporated particularly at the bottom of the mirror box within the camera body, there is a problem to be solved because there are spatial limitations as compared with the incorporation of the device into the viewfinder. That is, to realize the focus detection based on the above-described principle, between the pre-imaging plane of the objective lens and the photoelectric converters, there must be a sufficient distance to enable the re-imaging lenses to re-image the image formed by the objective lens and this leads to the necessity of enlarging the dimensions of a part or the whole of the camera body.

Further, in incorporating such a focus detecting device into a camera, a field lens, for imaging the pupils of the re-imaging lenses near the exit pupil of the objective lens so that the image is contained within the exit pupil, is disposed near the pre-imaging plane of the objective lens, whereby the occurrence of any error in focus detection can be prevented. However, the field lens disposed at such a location comes close to an effective light beam passing from the objective lens to the film surface during photography, and this has led to the disadvantage that the field lens may interfere with part of the effective light beam or that the reflected light from the surface of the field lens may cause undesirable flare or ghosts on the phototaking picture plane.

SUMMARY OF THE INVENTION

It is an object of the present invention to provide a single lens reflex camera having a focus detecting device spatially efficiently disposed at the bottom of the camera body.

It is another object of the present invention to provide a single lens reflex camera improved to enable the above-described device to be disposed without adversely affecting the phototaking light beam.

The invention will become fully apparent from the following detailed description thereof taken in conjunction with the accompanying drawings.

DESCRIPTION OF THE PREFERRED EMBODIMENTS

Figure 1:
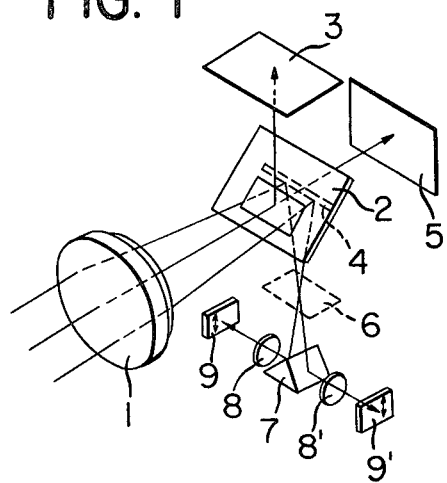
FIG. 1 is a perspective view of a device according to an embodiment of the present invention.
Figure 2:
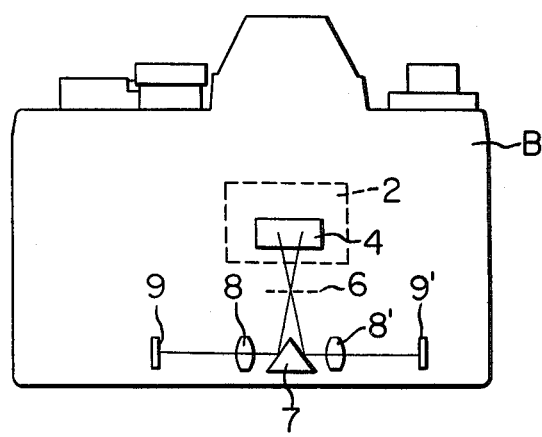
FIG. 2 is a schematic front view of the FIG. 1 device as incorporated into a camera.

An embodiment of the present invention is shown in FIGS. 1 and 2. Part of the light passed through a phototaking objective lens 1 is reflected by a main reflecting mirror 2 formed so as to be capable of partially passing light therethrough and rockable for retraction from the optical path during photography and is imaged on a focusing screen 3. The remainder of the light is downwardly reflected by an auxiliary reflecting mirror 4 disposed rearwardly of the main reflecting mirror 2 and forms an aerial image on a surface 6 conjugate with a film surface 5. Further, the light from this aerial image is separated in opposite directions lengthwisely of the camera body, i.e., substantially orthogonal to the optical axis, by a third reflecting mirror 7 provided below the surface 6, and the separated light beams are re-imaged on photoelectric converters 9 and 9' by re-imaging lenses 8 and 8', respectively. The object image is moved vertically on the photoelectric converters 9 and 9', as viewed in FIG. 1, by movement of the objective lens 1 in the direction of the optical axis. By comparing the outputs of these photoelectric converters 9 and 9', focus detection may be accomplished by the use of a well-known method.

With such a construction, in spite of the fact that a sufficient distance between the surface 6 conjugate with the film surface and the photoelectric converters 9, 9', namely, the length of the optical path is necessary for re-imaging, the optical system for focus detection can be spatially efficiently contained by the utilization of the lengthwise dimension of the camera body B.

In the present embodiment, the re-imaging lenses 8 and 8'are disposed between the reflecting mirror 7 and the photoelectric converters 9, 9', but alternatively, they may be disposed between the reflecting mirror 4 and the reflecting mirror 7.

Figure 3:
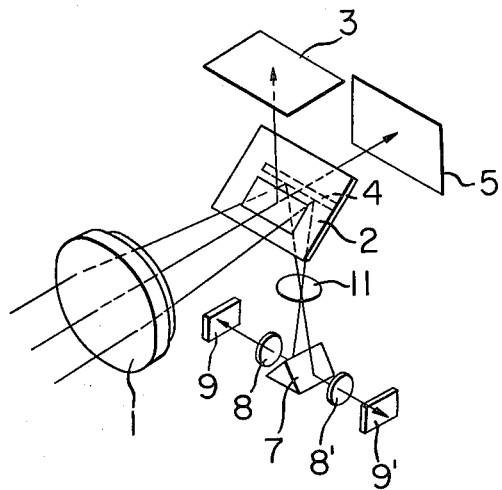
FIG. 3 is a perspective view of a device according to another embodiment of the present invention.

In another embodiment shown in FIG. 3, a field lens 11 is provided near the position of surface 6 of FIG. 1. This field lens 11 has the function of preventing part of a light beam forming corresponding images on the end portions of the photoelectric converters 9 and 9' by the re-imaging lenses 8 and 8' from being displaced from the exit pupil of the objective lens 1, thereby eliminating any irregularity in the brightness of the images on the photoelectric converters. Again with this construction, there may be obtained a spatially efficient arrangement as in the embodiment of FIG. 2, whereas a disadvantage peculiar to such a construction is that since it is difficult due to spatial limitations to dispose the auxiliary mirror 4 forwardly on the optical axis toward the objective lens 1 (in the direction in which the objective lens 1 exists), the location of the field lens 11 is above or near the bottom surface of the mirror box of the camera. As a result, part of the effective light beam passing to the film surface 5 may be hindered by the field lens 11 or the reflected light from the surface of the field lens 11 may reach the film surface 5 to cause undesirable flare or ghosts at the phototaking picture plane. An improvement over this embodiment is shown in FIG. 4.

Figure 4:
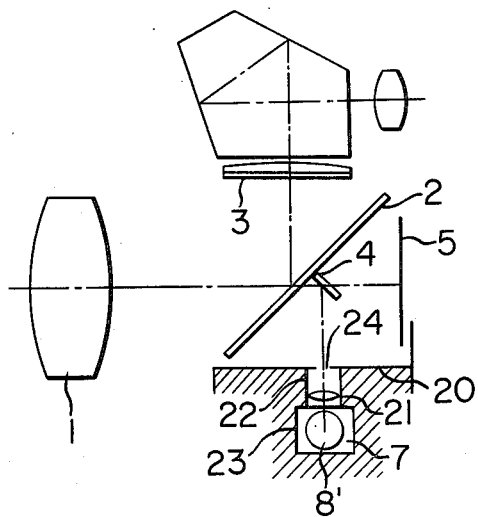
FIG. 4 is a side cross-sectional view of a camera in which a device according to still another embodiment of the present invention is incorporated.

In the camera of FIG. 4, the bottom surface 20 of the mirror box is substantially coincident with a position conjugate with the film surface 5, namely, the pre-imaging plane of the objective lens 1. A field lens 21 is fitted in a vertical hole 22 formed in the bottom surface 20, and the reflecting mirror 7, the lenses 8, 8' and the photoelectric converters 9, 9' are fitted in a horizontal hole 23 formed below the vertical hole 22. A field stop 24 is formed at the entrance of the vertical hole 22. Accordingly, even if the field lens 21 does not lie on the pre-imaging plane of the objective lens 1, excess light is blocked by the field stop 24 and therefore, no error in focus detection is caused.

Also, since the field lens 21 is disposed below the bottom surface 20, the deleterious light which would be reflected from the surface of the field lens 21 is substantially completely shielded by the wall surface of the vertical hole 22 and the field stop 24, thus eliminating ghosts or flare on the film surface 5.

In the case of the FIG. 4 embodiment, the field lens 21 is disposed at a location displaced from the pre-imaging plane of the objective lens 1, but it is still possible to provide the field lens 21 with the same function as that of the field lens 11 of FIG. 3 by appropriately selecting the power of the field lens 21 such that the pupils of the re-imaging lenses 8, 8' are imaged near the exist pupil of the objective lens 1.

I claim:

1. In a single lens reflex camera including a housing, a main reflecting mirror capable of partially transmitting incident light therethrough and disposed in a light path passing through a mirror box provided between an objective lens and a film surface so as to direct a light beam passing through said objective lens to a viewfinder optical system, an auxiliary reflecting mirror for reflecting the light transmitted through said main reflecting mirror toward a predetermined wall surface of said mirror box lying at a location opposed to said viewfinder optical system with said main reflecting mirror interposed therebetween, and an optical device for detecting the focused condition of said objective lens with respect to an object to be photographed, the housing having a lengthwise dimension perpendicular to the optical axis of the objective lens that is greater than its dimension in the direction of the optical axis, the improvement wherein said mirror box is formed with a depression in said predetermined wall surface and said optical device is disposed in the depression, said predetermined wall surface being substantially coincident with a pre-imaging plane of the objective lens that is conjugate with said film surface, and wherein said optical device comprises field stop means formed at an opening of said depression and located in said predetermined wall surface, field lens means disposed in an optical path leading from said field stop means, reflecting means having first and second reflecting surfaces for separating the light from said field lens means into two mutually opposed directions substantially parallel to said lengthwise dimension of the housing, first and second photoelectric converter means provided on the optical paths of the light beams separated by said first and second reflecting surfaces and spaced along the lengthwise dimension of the housing, the distance between said reflecting means and each of said photoelectric converter means along said lengthwise dimension being substantially greater than the distance between said pre-imaging plane and said reflecting means, and a pair of re-imaging lens means disposed in the optical paths leading from said reflecting means to said first and second photoelectric converter means for forming first and second images on said first and second photoelectric converter means, respectively, from an image formed by said objective lens at said pre-imaging plane.

2. The improvement recited in claim 1, wherein said field lens means has a power selected such that an image of a pupil of each of said re-imaging lens means can be formed within an exit pupil of said objective lens.

* * * * *